Sept. 18, 1956
E. S. PEARCE
2,763,373
FILTER CARTRIDGE
Filed Sept. 23, 1953
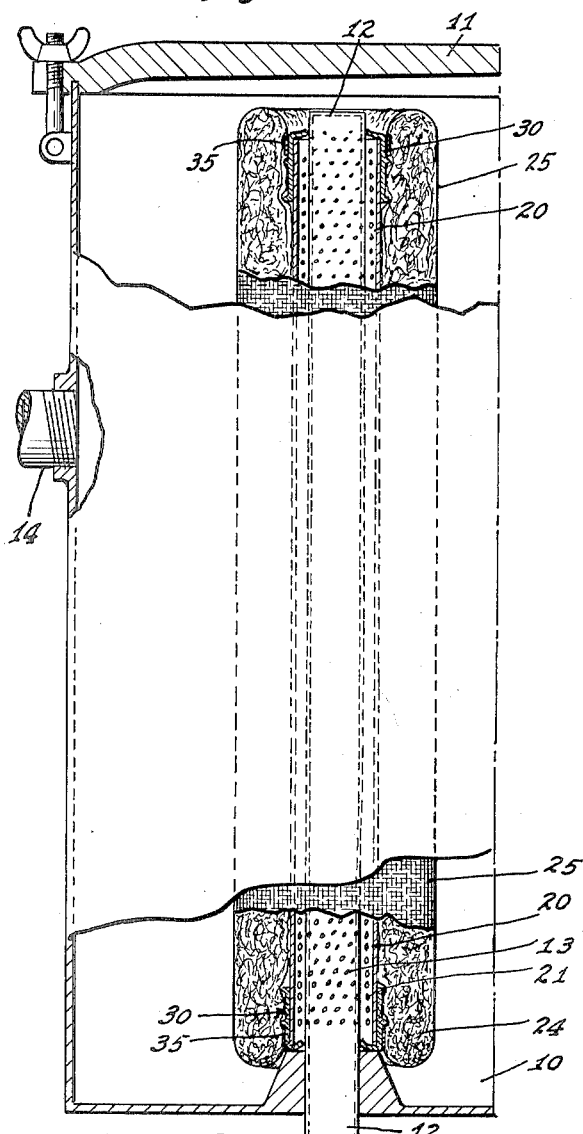
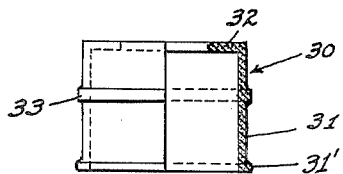
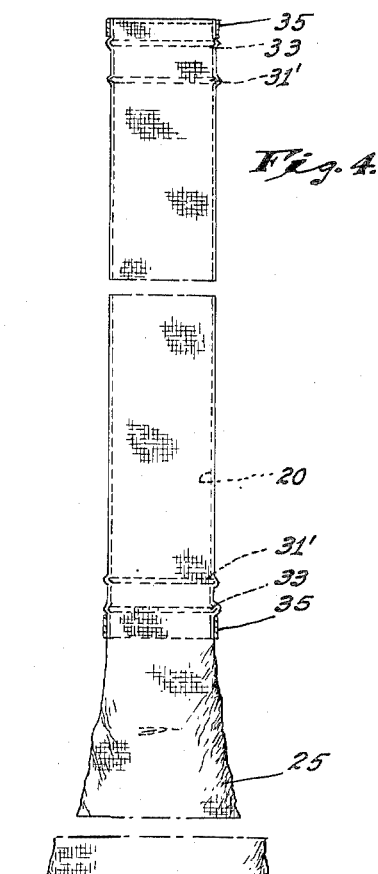
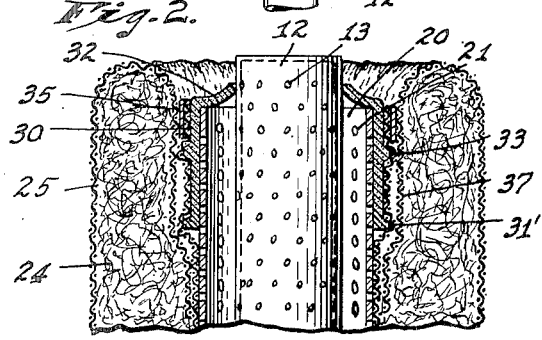
INVENTOR.
EDWIN S. PEARCE,
BY
*Schley, Nash & Jenkins*
ATTORNEYS.

United States Patent Office 2,763,373
Patented Sept. 18, 1956

2,763,373

FILTER CARTRIDGE

Edwin S. Pearce, Indianapolis, Ind., assignor to Railway Service and Supply Corporation, Indianapolis, Ind., a corporation of Indiana Application September 23, 1953, Serial No. 381,799

6 Claims. (Cl. 210—148)

This invention relates to a filter such, for example, as is commonly used in filtering the lubricating oil for diesel engines, and more particularly to that type of filter having a central, foraminous tube which supports an annular body of filtering material through which the liquid to be filtered flows in an inward radial direction. A filter cartridge comprising the central tube and the annular body of filtering material is commonly supported, when in use, upon an outlet pipe having a multiplicity of perforations in its wall to permit the ingress of liquid which has passed through the filtering medium and the cartridge-tube.

In the use of filter cartridges of the type described, it is necessary to provide at the ends of the cartridge a seal which will prevent the liquid to be filtered from entering the cartridge-tube at the ends thereof. In some instances, it is customary to provide such a seal by extending the body of filtering material, which is usually compressible, beyond the ends of the tube and by mounting the cartridge in a casing having opposed walls forced against the ends of the filtering material in sealing relationship. This arrangement has the disadvantage that the length of the cartridge must be rather carefully controlled in order to insure the existence of pressure between it and the opposed walls of the housing. Another expedient which has been used in sealing the ends of the cartridge tube is to crimp the tube-ends around the periphery of a flexible, annular gasket the center opening of which is sized to fit in sealing relation with the outlet pipe upon which the cartridge is supported. This arrangement eliminates the necessity for accurate control of the length of the cartridge, but has several disadvantages among which is the fact that the seal cannot be renewed or replaced without damaging the core-tube.

It is an object of this invention to provide an improved means for sealing the ends of a filter cartridge of the type described. More specifically, it is an object of the invention to provide for the ends of the core-tube a seal which can readily be removed and replaced without damage to the core tube. Another object of the invention is to provide for the ends of the core-tube a seal which will seal against the outlet pipe in any annular or axial position of the filter cartridge thereon and which will protect the ends of the core-tube from damage.

In carrying out the invention, I provide for each end of the core-tube a flexible cap having an annular body portion adapted to fit snugly over the tube-end and an annular flange projecting radially inward and having a central opening slightly smaller than the exterior diameter of the outlet tube upon which the filter cartridge is to be mounted. Desirably, the body of the cap is provided intermediate its axial extent with an exterior annular rib or flange, and a similar rib or flange may also be provided at the end of the cap opposite the annular flange. The annular rib at the end of the cap serves the purpose of strengthening the cap-body and reducing the likelihood of tearing when it is stretched for application to the end of a core tube. The intermediate annular rib is of use in attachment of the knit socking which is commonly used to enclose the filtering material.

The accompanying drawing illustrates the invention:

Fig. 1 is a side elevation, in partial section, of a filter showing a filter cartridge in place therein;

Fig. 2 is a fragmental vertical section illustrating the upper end of the filter cartridge as mounted on a vertical outlet pipe;

Fig. 3 is a side elevation in half-section showing a sealing cap; and

Fig. 4 is an elevational view illustrating the manner in which the socking is applied to the core-tube.

The filter shown in the drawing comprises a housing 10 having an open top closed, when the filter is in use, by a removable closure 11. One or more outlet pipes 12 mounted in the bottom wall of the housing 10 extend upwardly within the housing for application of filter cartridges, each of such outlet pipes having its upper end closed and being provided in its wall with a multiplicity of openings 13 for ingress of filtered oil. The housing 10 has an inlet opening adapted to receive a supply pipe 14 through which liquid may flow into the housing for passage through a filter mounted on each pipe 12 and into such pipe through the openings 13.

The filter cartridge shown in the drawing comprises a central core-tube 20 having a diameter substantially greater than the diameter of the outlet pipe 12. Such core-tube, which is conveniently formed of sheet metal, has a multiplicity of perforations 21. The filtering material 24, which may take any convenient form but which is preferably cotton waste, is held in place on the tube 20 through the use of a sleeve 25 of knit socking. In the customary method of constructing the filter, the filter core 20 is inserted into one end of the knit sleeve 25, is secured thereto, the sleeve 25 is then turned inside out and stuffed with the filtering material, and its end is turned inwardly and tucked into the space between the filtering material 24 and the core 20, all as described in greater detail hereinafter.

It will be evident that in the use of the described cartridge, which is not new with me, some provision must be made for preventing oil in the housing 10 from entering the core 20 at the ends thereof and without passing through the filtering material 24. For this purpose, I provide at each end of the cartridge a seal 30 in the form of a cup-like body of an appropriate elastic material such as an oil-resistant synthetic rubber. The seal 30 comprises an annular body portion 31 adapted to fit tightly around the end of the core 20 and, at one end of such body portion, an inwardly extending flange or lip 32 the normal internal diameter of which is slightly less than the outer diameter of the outlet pipe 12. To reinforce the edge of the seal and reduce the possibility of tearing when it is stretched for application to the end of the core 20, the seal-body 31 may be provided with an exterior strengthening bead 31'. Intermediate the ends, the seal-body 31 may have a second annular bead 33 the purpose of which will hereinafter become evident. When, with seals 30 applied over the ends of the core 20, the cartridge is mounted on the pipe 12, the ribs 32 will be elastically distorted and will resiliently grip the outer surface of the pipe 12 to prevent the direct entrance of oil into the annular space between such pipe and the core 20.

In constructing a cartridge embodying the seals 30, such seals are applied to the ends of the core, and the core is then inserted into one end of the fabric sleeve 25, or into the position illustrated in Fig. 4 where one end of the sleeve 25 is substantially flush with one end of the core 20. The sleeve is then stretched longitudinally to reduce its diameter to that of the core and, in such stretched condition is secured to the core at the ends thereof, as by strips of pressure-sensitive or other adhesive tape 35. Desirably, each strip of tape is located outwardly beyond the bead 33 of the adjacent cap and has a width such that it extends from such bead to the end of the core. That portion of the sleeve 25 which projects beyond the core is then turned inside out and the sleeve is stuffed with the filtering material 24. When the stuffing operation is completed, the end of the sleeve 25 is tucked into the cartridge between the filtering material and the core as indicated at 37 in Fig. 2.

The beads 33 on the seals cooperate with the respectively associated tapes 35 to hold the sleeve 25 in the desired position and condition on the core prior to, during, and subsequent to the stuffing operation. The beads 31' and 33 on the seal at the upper end of the core, in cooperation with the resilience of the filtering material, create a substantial opposition to withdrawal of the tucked-in sleeve-end 37.

Because of the elastic nature of the seals 30, they will fit tightly and seal against the outer surface of the core 20 even if such core is not accurately circular in cross section; and, as pointed out above, the elastic lip 32 will seal tightly against the outlet pipe 12 of the filter. In this manner, entrance of oil into the interior of the core at the ends thereof is effectively prevented and all oil is compelled to pass radially through the filtering material 24. The seals, by covering the ends of the core, protect the core-ends from damage and protect personnel handling a cartridge from injury that might result from the exposed, relatively sharp ends of the sheet-metal core. Should the seal itself become damaged, it can easily be removed and replaced without damage to the core. Since the seal is held in place by fit of the body 31 against the exterior of the core no space between the core and the pipe 12 is necessary for attachment of the seal to the core, and seals embodying my invention can therefore be used where there is only a small difference in diameter between the core and the pipe 12.

I claim as my invention:

1. In an annular filter cartridge adapted to receive an outlet pipe for filtered liquid and comprising a foraminous tubular core surrounded by an annular body of filtering material, a seal of elastic material for each end of said core, said seal comprising an annular body embracing said core in sealing relation thereto and an annular lip extending radially inwardly beyond the adjacent end of the tube for sealing engagement with the outlet pipe, a sleeve of knit socking having an inner stretch closely surrounding said core and an outer stretch surrounding the filtering material, the end of said outer stretch being tucked in between the filtering material and the seal at one end of the core, said filtering material being elastically compressible in the mass and being held in a state of compression by the sleeve, said seal having intermediate the extent of such tucked-in end an exterior projection toward which the tucked-in sleeve-end is forced by the compressed filtering material.

2. A filter cartridge as set forth in claim 1 with the addition that said projection is an annular bead.

3. In an annular filter cartridge adapted to receive an outlet pipe for filtered liquid and comprising a foraminous tubular core surrounded by an annular body of filtering material, an exterior annular bead provided on said core adjacent but spaced from one end of the core, a sleeve of foraminous, stretchable fabric having inner and outer, radially spaced tubular stretches, said inner stretch closely surrounding said core and extending longitudinally thereof in both directions from said bead, and means located axially outward of said bead and tightly embracing the end of the inner sleeve-stretch for securing it in position, the outer sleeve-stretch surrounding the filtering material and holding it in place.

4. In an annular filter cartridge adapted to receive an outlet pipe for filtered liquid and comprising a foraminous tubular core surrounded by an annular body of filtering material, an exterior annular bead provided on said core adjacent but spaced from each end of the core, a sleeve of foraminous, stretchable fabric having inner and outer, radially spaced tubular stretches, said inner stretch closely surrounding said core and extending longitudinally thereof in both directions from said bead, and means located axially outward of each bead and tightly embracing the end of the inner sleeve-stretch for securing it in position, the outer sleeve-stretch surrounding the filtering material and holding it in place.

5. In an annular filter cartridge adapted to receive an outlet pipe for filtered liquid and comprising a foraminous tubular core surrounded by an annular body of filtering material, a seal of elastic material for each end of said core, said seal comprising an annular body embracing said core in sealing relation thereto and an annular lip extending radially inwardly beyond the adjacent end of the tube for sealing engagement with the outlet pipe, one of said seals having an exterior annular bead spaced axially from said lip, a sleeve of foraminous stretchable fabric having radially spaced inner and outer stretches, said inner sleeve-stretch closely surrounding said core and beaded seal, and means located axially outward of said bead and tightly embracing the inner sleeve-stretch to secure it in position, said outer sleeve-stretch surrounding the filtering material to hold it in place.

6. In an annular filter cartridge adapted to receive an outlet pipe for filtered liquid and comprising a foraminous tubular core surrounded by an annular body of filtering material, a seal of elastic material for each end of said core, said seal comprising an annular body embracing said core in sealing relation thereto and an annular lip extending radially inwardly beyond the adjacent end of the tube for sealing engagement with the outlet pipe, each of said seals having an exterior annular bead spaced axially of said lip, a sleeve of foraminous stretchable fabric having radially spaced inner and outer stretches, said inner stretch closely surrounding said core and seal-bodies, and means located outwardly beyond the bead at each end of the core and tightly embracing the inner sleeve-stretch to hold it in position, said outer sleeve-stretch surrounding the filtering material to hold it in place.

References Cited in the file of this patent

UNITED STATES PATENTS

| 2,301,121 | Kamrath | Nov. 3, 1942 |
| 2,314,640 | Winslow et al. | Mar. 23, 1943 |
| 2,334,664 | Wicks | Nov. 16, 1943 |
| 2,337,238 | Griffith | Dec. 21, 1943 |
| 2,460,851 | Sheppard | Feb. 8, 1949 |
| 2,613,814 | Moore | Oct. 14, 1952 |
| 2,675,919 | White | Apr. 20, 1954 |

FOREIGN PATENTS

| 381,806 | Great Britain | Oct. 13, 1932 |